United States Patent [19]

Graf et al.

[11] Patent Number: 4,850,097

[45] Date of Patent: Jul. 25, 1989

[54] METHOD FOR THE MANUFACTURE OF A SEALING RING WITH A SEALING LIP HAVING HYDRODYNAMICALLY ACTING RETURN ELEMENTS

[75] Inventors: Gunter Graf, Weinheim; Heinz Gross, Birkenau; Stefan Sponagel, Rimbach, all of Fed. Rep. of Germany

[73] Assignee: Firma Carl Freudenberg, Weinheim, Fed. Rep. of Germany

[21] Appl. No.: 62,160

[22] Filed: Jun. 12, 1987

[30] Foreign Application Priority Data

Jun. 25, 1986 [DE] Fed. Rep. of Germany ....... 3621241

[51] Int. Cl.4 .................. F16J 15/00; B29C 65/56
[52] U.S. Cl. .................... 29/511; 29/522.1;
264/108; 264/173; 264/174; 264/177.1;
264/177.17; 264/177.2; 264/209.3; 264/210.1;
264/210.6; 264/249; 264/250; 264/262;
264/339
[58] Field of Search ............ 264/150, 209.2, 249,
264/177.16, 177.14, 108, 173, 174, 177.1,
177.17, 177.2, 209.3, 210.1, 210.6, 249, 250, 262,
339; 425/321; 29/511, 522.1

[56] References Cited

U.S. PATENT DOCUMENTS 3,404,203 10/1968 Donald .............................. 264/209.2
4,672,733 6/1987 Schmitt ................................ 264/262

FOREIGN PATENT DOCUMENTS 2406821 11/1974 Fed. Rep. of
Germany ........................ 264/177.16
59-83629 5/1984 Japan .............................. 264/177.16

Primary Examiner—Hubert Lorin
Attorney, Agent, or Firm—Kenyon & Kenyon

[57] ABSTRACT

In a method for manufacturing a sealing ring with a sealing lip, the material forming the sealing lip is fabricated in plastically deformable condition into the shape of a column-like hollow body. Prior to solidification, the column-like hollow body is twisted between axially spaced cross-sectional planes. This forms return elements with hydrodynamic action. Subsequently, the hollow body is solidfied and its diameter is enlarged axially outside the region of the sealing lip and it is then secured in a sealing ring housing.

7 Claims, 1 Drawing Sheet

1

METHOD FOR THE MANUFACTURE OF A SEALING RING WITH A SEALING LIP HAVING HYDRODYNAMICALLY ACTING RETURN ELEMENTS

FIELD OF THE INVENTION

This invention relates to a method for the manufacture of a sealing ring with a sealing lip. The material forming the sealing lip is fabricated when it is in a plastically deformable condition into the shape of a hollow body. Prior to or during solidification of the material, this body is provided with hydrodynamically acting return elements for leakage liquid in the region of the dynamic-sealing zone of the finished sealing lip. The sealing lip so obtained is secured in a sealing ring housing.

BACKGROUND OF THE INVENTION

Such a method is generally described in DE-AS 11 53 578. In this reference, the shaping and solidification of the hydrodynamically acting return elements is combined in a closed operating step. For this reason, the tool employed must correspond to the contour of the finished sealing lip. This sealing lip is extremely complicated to manufacture inasmuch as the hydrodynamically acting return elements can develop effectiveness only if they extend non-axially with respect to the sealing ring and the associated sealed shaft.

OBJECTS OF THE INVENTION

It is an object of the present invention to provide a simplified and improved method for manufacturing a sealing ring having a sealing lip with hydrodynamically acting return elements. These and other objects of the present invention will become apparent from the following description and claims in conjunction with the drawings.

SUMMARY OF THE INVENTION

According to the present invention, a hollow body in a plastically deformable condition is generated in the form of a column. Prior to solidification, the column shaped hollow body is twisted between cross-sectional planes of the column shaped hollow body having axial spacings between one another. The hollow body is solidified and its diameter is enlarged outside the region which will act as the sealing lip. Then, it is secured in the housing of the sealing ring.

In the method according to the present invention, a column-shaped hollow body is formed in a first operating step from a plastically deformable polymer material and the walls of the hollow body are parallel to the axis of the column in all subregions. The plastically deformable hollow body having the shape of a column is then rotated about its axis between cross-sectional planes having an axial spacing from each other. The body then solidifies whereby a permanent pleating of the hollow body extending at an angle to the output direction, i.e., the original axis, is obtained. The development of the pleating depends on the intensity of the twisting. Excellent sealing results are obtained if the angle of rotation is between 5° and 15°.

It is in principle sufficient if such pleating is carried out only in the axial region of the column-like hollow body which will bound the sealing gap within the finished sealing ring. However, pleating along the axial extent of the column-like hollow body is likewise possible and can be made on a hollow body of any length, from which individual sealing lips are cut prior to or during the time that it is secured in the accommodating housing of the sealing ring. A suitable method for securing the sealing lip to the housing is described, for instance, in German Patent 32 46 152. The method of this patent in conjunction with the method of the present invention is particularly suitable for the mass production of sealing rings.

The hollow body can be fabricated using a ring nozzle and can be twisted immediately subsequent to its formation to the degree desired. Such a procedure makes unnecessary a renewed transformation of the material forming the hollow body into a plastically deformable condition and it is recommended primarily in cases wherein a sealing material which can be cross-linked by heat is used.

With such a procedure, the hollow body can also be provided, when emerging from the ring nozzle, on the inside with ribs and/or slots extending in the axial direction. The latter are changed by the twisting of the hollow body within itself in their relationship to the axial direction, and subsequently enclose with respect to the axial direction an acute angle. In contrast to a procedure wherein the hollow body is bounded, prior to its being twisted on the inside by a smooth cylinder surface, a distinct increase of the return action exerted on the leakage liquid is obtained if the sealing ring is used as intended.

A similar effect can be achieved if the material extruded from the ring nozzle in a plastically deformable condition has first been provided with a uniformly distributed content of short fibers. During the emergence of the material from the ring nozzle, the fibers are brought into a parallel position with each other and to the hollow body due to the increase in velocity resulting therefrom. The subsequent twisting of the still plastically deformable hollow body causes a modification or the directional orientation of the fibers in the same directional sense in accordance with the prior explanations. After the sealing ring is completed, especially good properties are obtained if the mixed-in short fibers have a greater hardness than the polymer sealing material enclosing them.

Nevertheless, excellent properties can be achieved using short fibers which are softer than the polymer sealing body. Preferred types of fibers are polyesters and/or polyamides having a length of 1 to 3 mm.

Embodiments of the method according to the present invention will be explained in detail with reference to the figures of the drawings.

DETAILED DESCRIPTION

Figure 1:
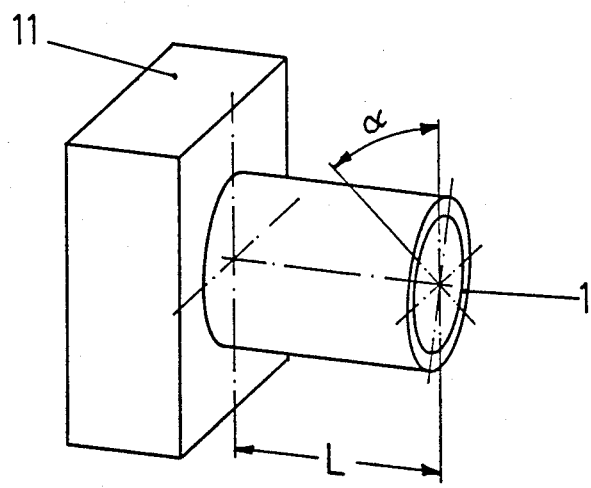
FIG. 1 illustrates the generation of the column-shaped hollow body 1, using a circular slot nozzle of an extruder, immediately followed by twisting of the hollow body still in the plastically formable condition between cross-sectional planes having an axial spacing L, and then subsequent solidification, all in accordance with the present invention.

The slot nozzle 11 illustrated in FIG. 1 is arranged at the injection head of an extruder (not illustrated). The exit opening of the nozzle 11 has the shape of a circular ring which is bounded on the inside and the outside by smooth surfaces.

A conventional sealing material is processed and it is transformed into the shape of a hollow cylinder with a smooth surface on the inside and outside. The hollow cylinder 1 leaves the slot nozzle 11 without any relative motion oriented in the circumferential direction and it is still in a plastically deformable condition. It is twisted in itself immediately afterwards and before it is solidified. The twisting takes place between cross-sectional planes having an axial spacing L. The twisting causes a relief-like structuring of the inside and the outside of the hollow cylindrical body in the form of mutually parallel fine pleats which enclose an acute angle with the axis of the hollow cylinder. The twisting angle alpha may be, e.g., 11° with the length of the ring-shaped body being 16 mm.

Figure 2:
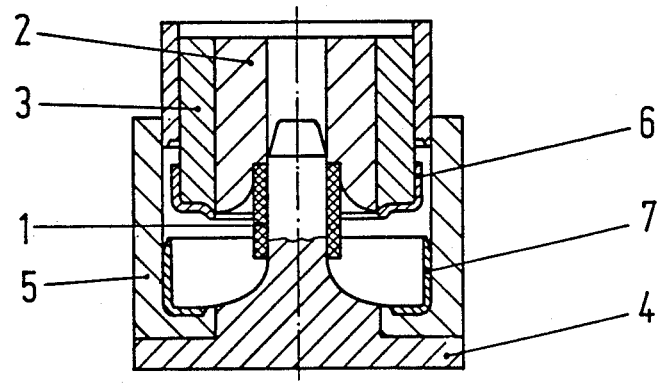
FIG. 2 illustrates inserting the now solidified, twisted, column-shaped hollow body 1 into the assembly tool used for securing it in the receiving housing of a sealing ring.

The subsequently obtained solidified hollow body 1 having a column-like shape is inserted into an assembly tool in the manner illustrated in FIG. 2. This tool comprises an upper part 2 with a closer 3 which can be advanced depending on the rhythm. The lower part 4 has an ejector 5 which can be moved independently thereof. The closer 3 occupies a position shifted backwards relative to the upper part of the tool and supports the loosely slipped-on inner ring 6 of the receiving housing of the sealing ring going to be manufactured. The associated stiffening ring 7 of the sealing ring housing is inserted into the ejector 5. The assembly tool is therewith completely prepared for the deformation of the column-shaped hollow cylinder 1 and its mutual connection to the inner ring 6 and the stiffening ring 7 of the sealing ring housing. The inner ring 6 and the stiffening ring 7 of the sealing ring housing are suitably fabricated from sheet steel.

The operational step is initiated by a coaxial motion of the upper part 2 of the tool relative to the closer 3 toward the lower part 4 of the tool. The column-shaped hollow cylinder 1 thereby is given a gradual trumpet-like flare to its lower portion which is terminated in the formation of a flange 9 arranged between the radially inward-pointing legs of the inner ring 6 and the stiffening ring 7. In the next following operating step, the closer 3 follows the previous motion of the upper part 2 of the tool, whereby the inner ring 6 of the sealing ring housing which is provided with a circular bead is pressed against the flange 9 in the axial direction.

Figure 3:
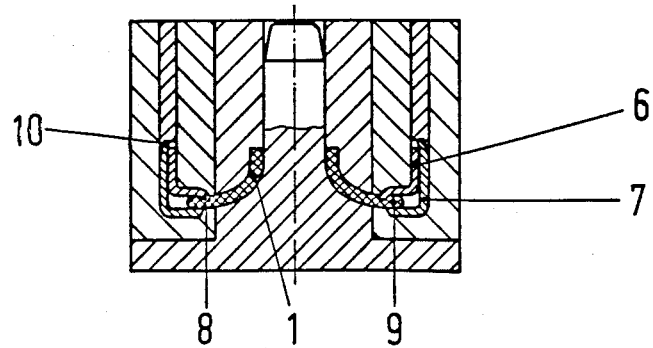
FIG. 3 illustrates the assembly tool of FIG. 2 after the completion of the closing motion with a finished sealing ring still located in the interior of the tool.

The result of this is a mechanically stable and liquid-tight fixation of the flange within the housing of the sealing ring. The mutual relationship of the flange 9 with housing is given a durable stabilization by the simultaneous or subsequent beading-over of the ends of the stiffening ring 7 protruding beyond the inner ring 6, as shown in FIG. 3. The tool can then be opened, the shaft sealing ring removed, and taken to its intended application.

The interior of the sealing lip of the seal formed from the hollow body 1 exhibits a microscopically fine pleating which cannot be recognized directly with the naked eye and which encloses an acute angle with the axial direction. The sealing ring manufactured by the method of the present invention runs essentially completely without leakage and has a clearly increased service life compared with designs in which the hydrodynamically active return elements have been generated by chip-removing methods or by vertical pressing of the surface of the sealing lip by an embossing tool.

Although preferred embodiments of the present invention have been described in detail, it will be apparent that modifications may be made by one skilled in the art all within the spirit and the scope of the present invention as defined in the claims.

What is claimed is:

1. A method for manufacturing a sealing ring having a sealing lip with said sealing lip having hydrodynamically acting return elements in a dynamic sealing zone of said sealing lip comprising:
    forming a hollow body in the shape of a column from a sealing material in a plastically deformable state, said column shaped hollow body having an axis;
    twisting said column shaped hollow body between axially spaced apart cross-sectional planes of said hollow body prior to solidification of said material to form hydrodynamically acting return elements comprising microscopically fine pleatings at an acute angle with respect to said axis of said hollow body;
    after solidification of said material, increasing the diameter of said column shaped hollow body in regions axially outside the region to be the sealing lip dynamic sealing zone; and then,
    securing said hollow body in a housing of a sealing ring.

2. A method according to claim 1 wherein said hollow body is formed by forcing said sealing material through a ring shaped nozzle and wherein said twisting step prior to solidification is applied immediately after said hollow body emerges from said ring shaped nozzle.

3. A method according to claim 1 wherein said hollow body is formed by forcing said sealing material through a ring shaped nozzle and further comprises forming ribs on the inside of said hollow body extending parallel to the axis thereof when said hollow body emerges from said ring shaped nozzle and wherein said twisting step prior to solidification aligns said ribs at an acute angle with respect to said axis of said hollow body.

4. A method according to claim 1 wherein said hollow body is formed by forcing said sealing material through a ring shaped nozzle and further comprises forming slots on the inside of said hollow body extending parallel to the axis thereof when said hollow body emerges from said ring shaped nozzle and wherein said twisting step prior to solidification aligns said slots at an acute angle with respect to said axis of said hollow body.

5. A method according to claim 2 wherein said sealing material contains short fibers and said fibers are predominantly parallel to the axis of said hollow body when said hollow body emerges from said ring shaped nozzle and wherein said twisting step prior to solidification aligns said fibers at an acute angle with respect to said axis of said hollow body.

6. A method according to claim 3 wherein said sealing material contains short fibers and said fibers are predominantly parallel to the axis of said hollow body when said hollow body emerges from said ring shaped nozzle and wherein said twisting step prior to solidification aligns said fibers at an acute angle with respect to said axis of said hollow body.

7. A method according to claim 4 wherein said sealing material contains short fibers and said fibers are predominantly parallel to the axis of said hollow body when said hollow body emerges from said ring shaped nozzle and wherein said twisting step prior to solidification aligns said fibers at an acute angle with respect to said axis of said hollow body.

* * * * *